US005247336A

United States Patent [19]

Mills, III

[11] Patent Number: 5,247,336

[45] Date of Patent: Sep. 21, 1993

[54] IMAGE FUSING APPARATUS HAVING HEATING AND COOLING DEVICES

[75] Inventor: Borden H. Mills, III, Webster, N.J.

[73] Assignee: Eastman Kodak Company, Rochester, N.Y.

[21] Appl. No.: 3,816

[22] Filed: Jan. 8, 1993

Related U.S. Application Data

[63] Continuation of Ser. No. 812,330, Dec. 23, 1991, abandoned.

[51] Int. Cl.5 .............................................. G03B 17/26

[52] U.S. Cl. .................................... 355/285; 355/295; 355/319; 219/10.57; 219/216; 219/469

[58] Field of Search ............... 355/282, 285, 289, 290, 355/295, 319; 219/469, 10.57, 216, 243

[56] References Cited

U.S. PATENT DOCUMENTS 4,905,050 2/1990 Derimiggio et al. ............... 355/290
4,963,943 10/1990 Tamary ............................... 355/290
4,984,027 1/1991 Derimiggo et al. ................ 355/290
5,030,987 7/1991 Kaco et al. ...................... 355/319 X
5,051,780 9/1991 Stelter et al. ......................... 355/208

*Primary Examiner*—Michael L. Gellner
*Assistant Examiner*—Patrick J. Stanzione
*Attorney, Agent, or Firm*—Tallam I. Nguti

[57] ABSTRACT

A fusing apparatus for fusing toner images onto a substrate. The fusing apparatus includes a heated first fusing member, a second timing member and a fusing mix formed by the first and second members. A substrate carrying an unfused toner image on a first side thereof is routed through the fusing nip such that the unfused toner image directly faces the heated first member, and the second side thereof directly faces the second fusing member. In order to prevent melting or remelting of a toner image on such second side, the fusing apparatus includes a device for cooling and maintaining the temperature of the second fusing member at a point below the melting temperature of toner particles forming the image on such second side.

12 Claims, 3 Drawing Sheets

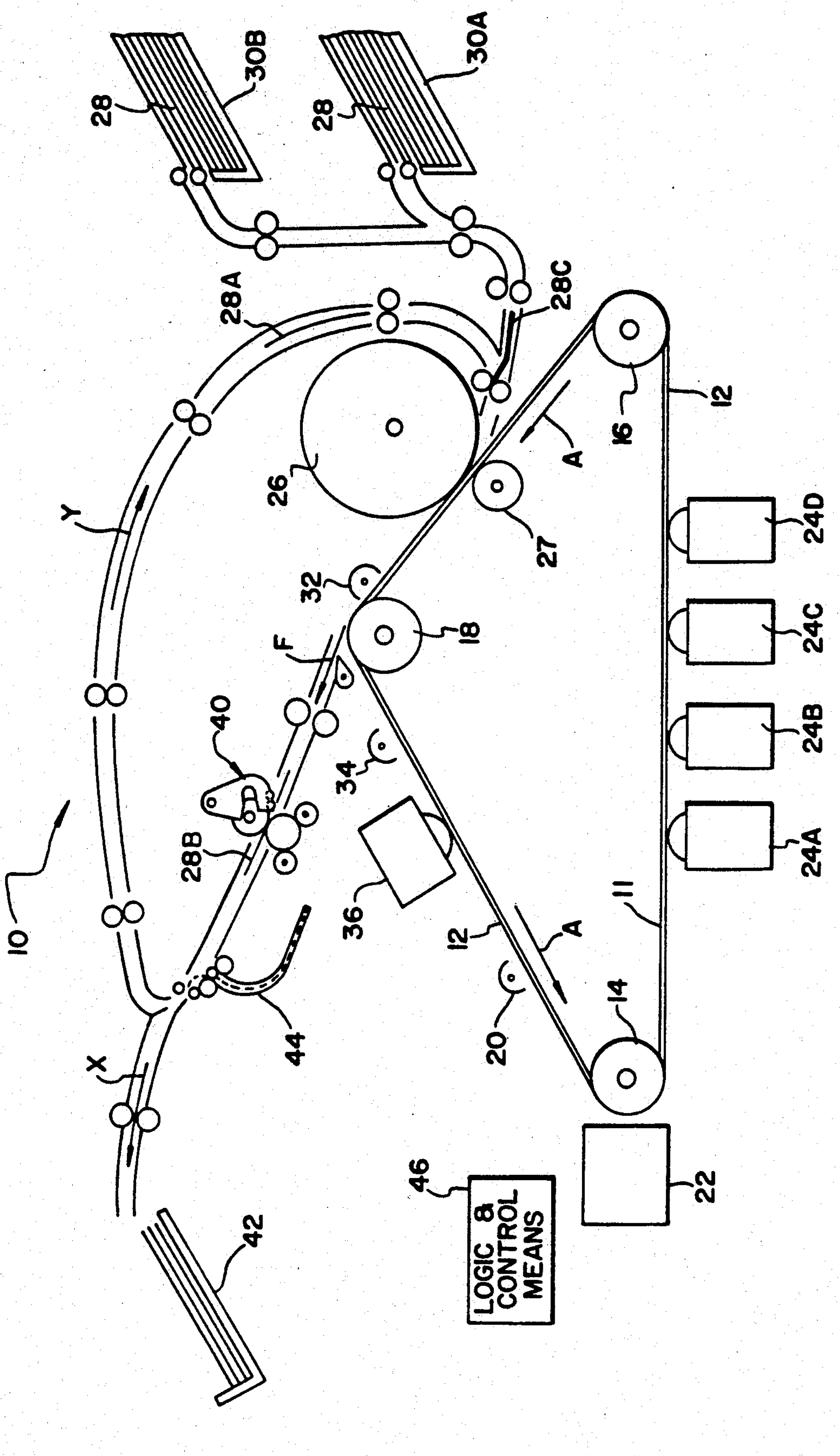
FIG. I

IMAGE FUSING APPARATUS HAVING HEATING AND COOLING DEVICES

This is a continuation of application Ser. No. 07/812,330, filed Dec. 23, 1991, now abandoned.

BACKGROUND OF THE INVENTION

1. Field of the Invention

The present invention relates to heat fusing apparatus for fusing toner images in an electrostatographic reproduction machine, such as a copier or printer. More particularly, the present invention relates to such a fusing apparatus that has heating and cooling means, thus making it particularly suitable for duplex or two-sided image fusing.

2. Description Relative to the Prior Art

In electrostatographic reproduction machines such as copiers and printers, it is well known to use a heat fusing apparatus to fuse toner images onto a side of a suitable substrate. The quality of such a fused image depends significantly on careful control of the fusing temperature of, and the amount of heat provided by, such a fusing apparatus. Examples of problems which occur when such careful control fails, are discussed for example in commonly assigned U.S. Pat. No. 4,963,943, issued Oct. 16, 1990 to Tamary. One such problem is "droop" that is, the delayed response to heat of a heated fuser roller, for which the '943 patent discloses a solution that includes carefully controlling the temperature of the fusing apparatus by simulating heat loss in the fuser roller with cool air.

Unfortunately, however, solving the droop problem, as such, is not enough to prevent other fusing problems for example in copiers and printers which produce and fuse double-pass duplex images on a substrate. Double pass duplex images are images on both sides of the substrate which are produced and fused one side at a time. Such other fusing problems for example include undesirable gloss which can result from reheating one of the duplex images during the fusing of the other image. Such undesirable gloss can be mottled gloss or any gloss that appears on the one side of the substrate but not on the other side thereof. Such an undesirable gloss problem will occur even in copiers and printers in which no "droop" problem exists.

More particularly, such a gloss problem is likely to occur in a copier or printer that uses a fusing apparatus which has an externally heated, axially unsupported fuser roller as disclosed for example in commonly assigned U.S. Pat. No. 4,905,050 issued Feb. 27, 1990 to Derimiggio et al. This is so because the pressure roller thereof which is used to contact and constrain the heated fuser roller itself becomes heated. Undesirable gloss results ordinarily when such a heated pressure contacts an already fused toner image on that side of a substrate contacting such a heated pressure roller.

SUMMARY OF THE INVENTION

In accordance with the present invention, a fusing apparatus is provided for use in electrostatographic reproduction machines for fusing a toner image that is formed using toner particles which have a known melting point. The fusing apparatus includes a first fusing member and a second fusing member which together form a fusing path through which a substrate carrying the toner image to be fused is routed. The substrate is routed such that the toner image thereon directly faces the first fusing member. The fusing apparatus also includes means for heating the first fusing member to at least the known melting point of the toner particles which form the image being fused, and temperature control means for maintaining the temperature of the second fusing member at a temperature below the melting point of such toner particles.

BRIEF DESCRIPTION OF THE DRAWINGS

In the detailed description of the invention presented below, reference is made to the drawings, in which:

FIG. 1 is a schematic of an electrostatographic reproduction machine such as a printer including the fusing apparatus of the present invention;

DETAILED DESCRIPTION OF THE PREFERRED EMBODIMENT

Figure 2B:
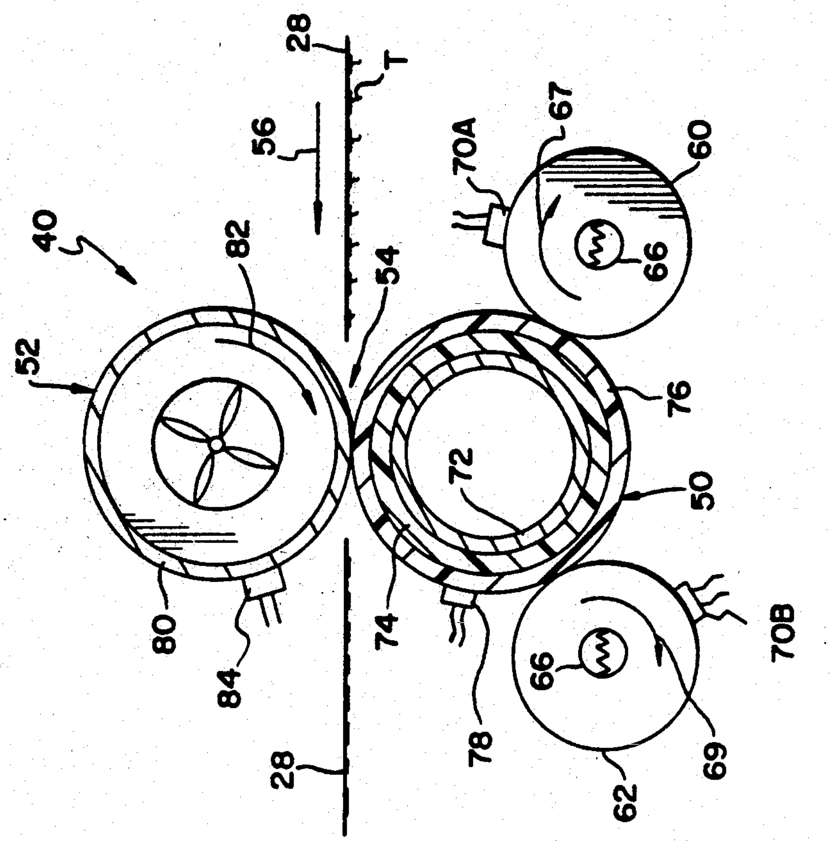
FIG. 2B is transverse cross-section of the apparatus of FIG. 2A.

Because electrostatographic reproduction apparatus or machines such as copiers and printers are well known, the present description will be directed in particular to elements, for example of a printer, which form part of or cooperate more directly with the present invention. Elements not specifically shown or described herein are assumed selectable from those known in the prior art.

Referring now to FIG. 1, an electrostatographic reproduction machine such as a printer is shown generally as 10 and is capable of operating in a simplex or duplex mode, that is, it is capable of producing images on one or both sides of a copy sheet or substrate. As shown, the printer 10 includes an image bearing member or photoconductor 11 that has a frontside image bearing surface 12 on which a plurality of images, including first and second images for duplex copying and transfer onto opposite sides of a receiver sheet. The member 11 for example is a continuous flexible web that is trained along a fixed path about a series of rollers 14, 16 and 18 for movement in the direction of the arrow A. One of the rollers, 14, 16, or 18 can be a drive roller, suitably driven by a conventional drive (not shown) for repeatedly moving the member 11 about the rollers 14, 16, 18 past a plurality of electrostatographic process stations. Although the image-bearing member 11 is shown as a flexible endless web, it should be understood that a rigid rotatable drum that has an image bearing or photoconductive surface can also be used.

As shown in FIG. 1, with the image bearing member 11 moving in the direction of the arrow A, a first process station includes a, primary charger 20, which is used for charging each section of the image bearing surface 12, passing thereunder, with a generally uniform electrostatic charge. At a next station, a latent image, for example a charge image of an original document, is formed on the charged section of the surface 12 by means for example of using an electronic print head 22 which imagewise discharges portions of the charged section of the surface 12. In optical copiers, such a latent image can be formed instead using optical means, as is well known.

The latent image is next moved to where a development apparatus for example as 24A developes or makes the image visible using toner particles. A plurality of additional such development apparatus are shown as 24B, 24C and 24D and may also be used similarly, as is known, when producing visible multicolor images. Each of such development apparatus 24A–24D contains developer material for example of a different color. Such developer material may consist of fusible toner particles only, or of a mixture of such toner particles and carrier particles. During the image development, as is well known, the toner particles transfer onto the latent image on the surface 12 thus making the image visible.

Downstream of the development apparatus 24A–24D, the developed or toned image on a section of the surface 12 is transferred using transfer means shown as 26, 27, onto a first side of a suitable receiver substrate 28, for example the substrate shown as 28C. The substrate 28C is fed, in registration, for example from a supply source 30A, 30B of such substrates or sheets to the transfer means 26, 27. The substrate may for example be plain paper or plastic transparency stock of discrete sheets stored in each supply source 30A, 30B. The transfer means 26, 27 for example can be a transfer drum 26, and a back up roller 27. After such transfers detack charger 32 is used to assist in effecting separation of the image carrying substrate 28 from the surface 12. Thereafter, the particular section of the surface 12 of member 11 from which the image has been transferred continues around the roller 18 past a preclean assist charger 34 which charges or neutralizes residual charges on such section and then moves past a cleaning apparatus 36 which removes residual particles from such section.

Meantime, the image carrying substrate 28C is fed away from the surface 12 in the direction of the arrow F towards the fusing apparatus of the present invention shown generally as 40. The toner image on the substrate shown, as 28B, is fused at the fusing apparatus 40 in a manner to be described below. Such substrate 28B is then fed from the fusing apparatus 40 either in the direction of the arrow X to an output tray or in the direction of the arrow Y for further processing.

As is well known, when the reproduction machine 10 is operating in a simplex mode, the substrates 28 which each carry a fused image only on a first side, are each fed after fusing in the direction of the arrow X to an output tray 42 for example. When the reproduction machine 10, on the other hand, is operating in a duplex mode, a substrate 28 shown for example as 28A, which is carrying a fused image on its first side when leaving the fusing apparatus 40, is first inverted or turned over by means such as a J-shaped turnover mechanism 44. The turned over substrate is then fed in the direction of the arrow Y by suitable sheet feeding means back to the transfer drum 26 to receive a second image on its second side. As described above, the image receiving second side of such a duplex substrate is then separated from the surface 12 in the same manner as the first side thereof was earlier separated there from. The duplex substrate is then again fed away from the surface 12 in the direction of the arrow F to the fusing apparatus 40 of the present invention for fusing of such second image on the second side thereof. Following the fusing of such second image, the fully-or duplex-imaged sheet is then fed in the direction of the arrow X to the output tray 42 for example. The manner and method of transferring duplex images as described above is exemplary only, and other methods and apparatus can also be used.

As is well known, the reproduction machine or printer 10 includes logic and control means shown as 46 for controlling the timing and functioning of the various operating components and modes of the machine or printer 10.

Figure 2A:
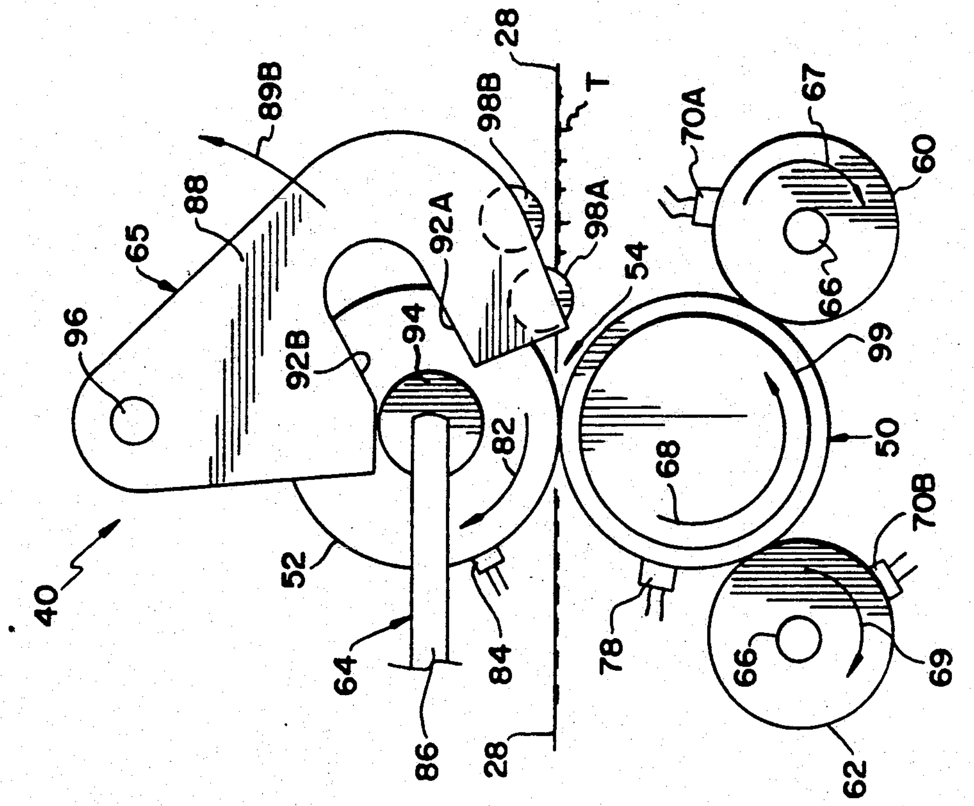
FIG. 2A is an end view of the fusing apparatus of the present invention in an operational or fusing mode.
Figure 3B:
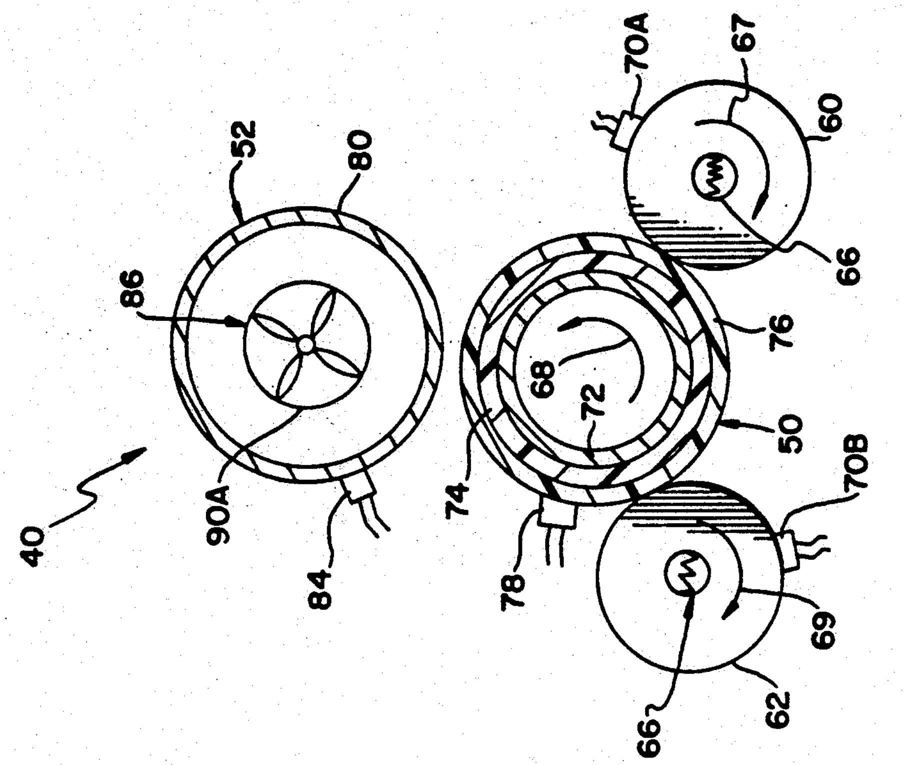
FIG. 3B is a transverse cross-section of the apparatus shown in FIG. 3A.
Figure 3A:
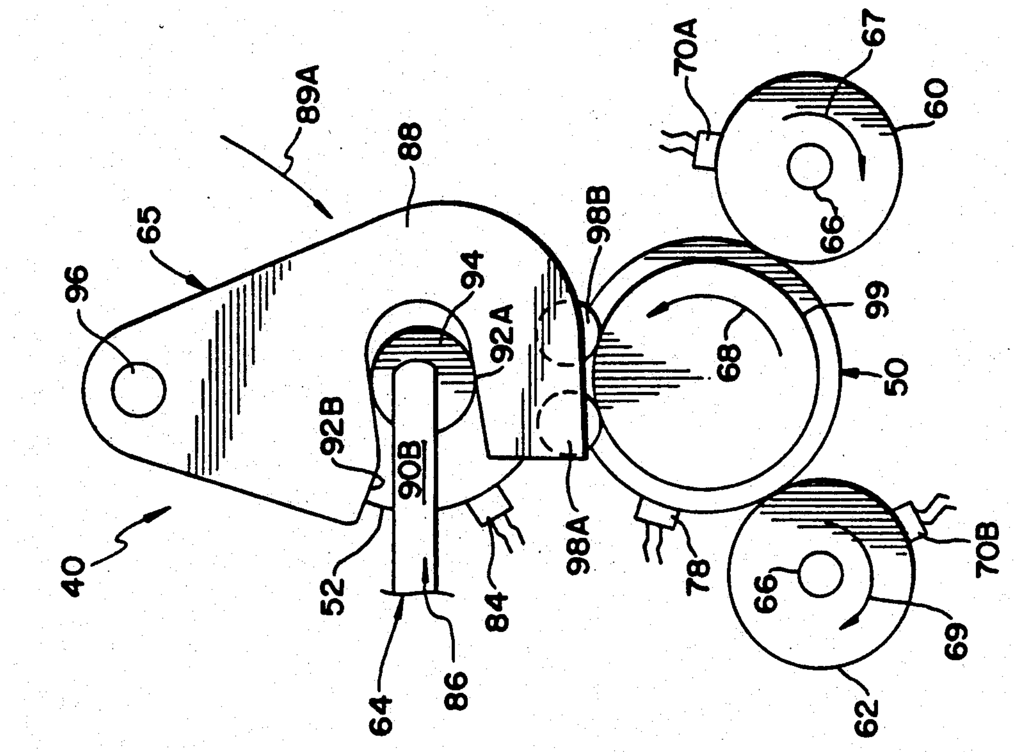
FIG. 3A is the apparatus of FIG. 2A in a non-operational or standby mode.

Referring now to FIGS. 2A–3B, the fusing apparatus 40 of the present invention is shown in its operating or fusing mode position (FIGS. 2A, 2B) and in its non-operating or standby position (FIGS. 3A, 3B). As shown, the fusing apparatus 40 includes a first fusing member 50 which for example is a fuser roller, and a second fusing member 52 which for example is a pressure roller. The first and second fusing members 50, 52 form a fusing path 54 which for example is a contact fusing nip, through which a substrate 28 carrying unfused toner images T can be routed in the direction of the arrow 56 for fusing. The substrate 28 is routed through the path or nip 54 such that the toner images T on a first side of such substrate for example directly face the first fusing member or fuser roller 50.

As shown, the fusing apparatus 40 has heating means which can be a pair of nesting heater rollers 60, 62, for heating the first member or fuser roller 50. The fuser roller 50 is heated such that the surface thereof reaches a fusing temperature that is at least as high as the known melting point of the toner particles forming the images T. The fusing apparatus 40 further includes temperature control means shown generally as 64, 65 which function to maintain the temperature of the second fusing member or pressure roller 52 at a temperature that is below the melting point of the toner particles forming the toner images T.

The pair of nesting heater rollers 60, 62 are each heated internally for example by respective lamps 66, and are mounted with their external surfaces spaced apart by a distance that is less than the diameter of the fuser roller 50 so as to enable proper nesting of the fuser roller therebetween. One of the nesting rollers 60, 62, for example the roller 60, can be a drive roller driven by conventional means (not shown). When driven, the drive roller 60 rotates in the direction of the roller 67, for example, and can frictionally drive the axially unsupported fuser roller 50 in the direction of the arrow 68. Such frictional driving of course can be achieved only when the axially unsupported fuser roller 50 is being retained or pressed against the nesting rollers 60, 62. Rotation of the heater roller 60 and of the fuser roller 50 as such causes the other nesting roller 62 to rotate in the direction of the arrow 69 as shown. As also shown, the heated nesting rollers 60, 62 may each include safety temperature sensors 70A, 70B respectively (which are connected as other operating components of the machine 10 to the logic and control means 46) for preventing run-away heating of either roller 60, 62.

Still referring to FIGS. 2A-3B, the first fusing member or fuser roller 50 is nested axially unsupported on the heater rollers 60, 62 for example, in the manner disclosed in commonly assigned U.S. Pat. No. 4,905,050 (which disclosure is incorporated herein by reference). Fuser roller 50 for example may comprise an inner core 72 and first and second elastomeric layers 74, 76 (FIGS. 2B, 3B). A temperature sensor 78 mounted thereon is used to enable control of the temperature of the surface of such fuser roller 50 at a suitable fusing temperature that is at least as high as or higher than the melting point of toner particles forming the toner images T. The second fusing member or pressure roller 52 may simply be comprised for example of a metallic shell 80 that may be actively driven separately, or frictionally through retaining contact with the fuser roller 50, in the direction of the arrow 82. When loaded against the fuser roller 50 as shown in FIGS. 2A and 2B, the pressure roller 52 functions to retain or press the fuser roller 50 against the nesting rollers 60, 62, thereby enabling the drive roller 60 thereof to frictionally drive the entire system as described above.

In accordance with the present invention, the fusing apparatus 40 further includes the temperature control means shown generally as 64, 65 for controlling the temperature of the pressure roller 52. As shown, the means 64, 65 (which are controlled by the logic and control means (LCM 46) include a temperature sensor 84, active cooling means 86, and a combination roller separating and retaining mechanism 65. The mechanism 65 is adapted to selectively load the pressure roller 52 against the fuser roller 50, or to selectively separate the two rollers 50, 52. To do so, the mechanism 65 is pivotably mounted and movable by suitable drive means (not) shown in a manner as shown by the arrows 89A, 89B.

The active cooling means 86 for example may include an air moving fan 90A with appropriate conduit means 90B, for selectively blowing cool air into and out of the hollow interior of the second fusing member or pressure roller 52. Such blown air quickly reduces the temperature of the metallic shell 80. The fan 90 as a part of the means 64, which is controlled by the LCM 46, can selectively blow such cool air in response to an output signal from the LCM 46 that in turn receives a signal input from the temperature sensor 84, for example, to indicate that the surface temperature of the roller is higher than desired. In accordance with the present invention, in order to prevent remelting of a previously fused image on the first side of a substrate which is being routed through the 54 such that such first side thereof faces or contacts the pressure roller 52 (as happens during the second pass of double-pass duplex fusing), the sensor 84 is set at a temperature control point that is below or that is lower than the melting point of the toner particles forming the fused images T. The temperature of the pressure roller 52 can be so maintained during both fusing and standby periods.

Because a quantity of heat (heat of fusion) is required for example at the melting point temperature to actually melt the toner forming the image in contact with the pressure roller, it has been found that depending on the fusing speed of the rollers 50, 52, the temperature of the pressure roller 52 can be controlled at a temperature point significantly higher than the melting point of the toner. This is due to the fact that even at such a higher temperature, the pressure roller 52 is not in contact long enough with the already fused image to provide the quantity of heat (heat of fusion) needed to remelt the toner image. Accordingly, the faster the fusing or nip speed of the rollers 50, 52, the higher the control temperature point can be for the pressure roller 52, and the slower the speed, the lower such a temperature control point.

For example, it was found that for heat and pressure roller fusing apparatus running at a fusing speed of twelve inches per second (12 ips) the temperature of the pressure roller for purposes of this invention could satisfactorily be maintained at about 280° F. without remelting an already fused image formed with toner particles having an ordinary melting point of 160° F. However when the fusing speed was slowed down to six inches per second (6 ips), the pressure roller temperature control point had to be lowered to about 220° F. in order to achieve similar results. The objective therefore is to control the temperature of the pressure roller at that temperature, for example the melting point temperature, which at a particular fusing speed will not remelt the already fused toner image contacting the pressure roller.

In the fusing apparatus 40, a combination mechanism 65 such as that illustrated is mounted at each end of the pressure roller 52, and functions during standby periods to separate the pressure roller 52 out of retaining and therefore heating contact with the heated fuser roller 50 (FIGS. 3A, 3B). Simultaneously, the mechanism 65 otherwise also functions then to retain the fuser roller 50 against the nesting rollers 60, 62 so as to enable the drive roller 60 to continue to frictionally drive and rotate the fuser roller 50 even when the pressure roller 52 is separated therefrom. As shown, each combination mechanism 65 includes a pivotable cam member 88 that has two oppositely acting cam surfaces 92A, 92B. The surfaces 92A, 92B cooperate with an end shaft 94 of the pressure roller 52 which acts as a cam follower, for example, to respectively raise or lower the pressure roller 52 relative to the fuser roller 50. The members 88 are each mounted pivotably on a shaft 96, for example, and both pivot, in a manner as shown by the arrows 89A, 89B, between a first operating position (FIG. 2A), and a second non-operating position (FIG. 3A).

As shown, each member 88 further includes stop means, for example, a pair of auxiliary rotatable wheels 98A, 98B, which are mounted at its distal end from the pivot shaft 96, for riding on the fuser roller 50 when the member 88 is in its second, non-operating position of FIG. 3A. The axially unsupported fuser roller 50 may for example include a bearing-surface end cap 99 at each end thereof on which the stop means or wheels 98A, 98B may ride. Each member 88 is mounted such that when moved to its first, that is, the operating position of FIGS. 2A, 2B, the first cam surface 92B thereof will act on the drive shaft 94 of the pressure roller 52 to load the pressure roller 52 into retaining or pressing contact against the axially unsupported fuser roller 50.

Each member 88 is also mounted as such so that when moved into its second, non-operating position of FIG. 3A, 3B, the stop means or wheels 98A, 98B will contact and ride on the bearing end cap 99 of the fuser roller 50 while the second cam surface 92A acts on the shaft 94 to move the pressure roller 52 away from the fuser roller 50. As such, the member 88 acts through the wheels 98A, 98B to continue to retain or press the heated fuser roller 50 against the nesting heater roller 60, 62 even while also separating the pressure roller from the heated fuser roller 50. Furthermore, separation of the pressure roller 52 as such from the heated fuser roller 50 serves to assist in cooling or maintaining the temperature of the pressure roller 52 at the set point of the sensor 84 below the melting temperature of toner particles forming a fused image on the side of a substrate that is in contact with the pressure roller 52 during fusing. There are of course no sheets being routed through the apparatus 40 when the roller 52 is in its non-operating position.

As can be seen, first toner images T formed on a first side of a substrate 28 can be routed through the fusing nip 54 such that the images T directly face the heated fuser roller 50. When the machine or printer 10 is operating for example in a double-pass duplex mode, the substrate 28 with a fused image on the first side thereof can be inverted and returned, in registration, to the transfer means 26, 27 to receive a second or duplex toner image T on a second side of such substrate. The duplex substrate with a fused first toner image on the first side thereof and an unfused second toner image on a second side thereof can then be routed through the fusing nip 54 a second time such that the second side thereof with unfused image thereon directly faces the fuser roller 50.

Advantageously, the fuser roller 40 of the present invention can safely and fully fuse the second toner image on such second side of the substrate without remelting the fused first toner image on the first of the substrate facing or contacting the pressure roller 52. Such remelting of the first fused image on such first side is prevented because the means 64, 65 function together to effectively control and maintain the temperature of the pressure roller 52 below the melting point of the toner particles forming such first fused toner image.

The invention has been described in detail with particular reference to a presently preferred embodiment, but it will be understood that variations and modifications can be effected within the spirit and scope of the invention.

What is claimed is:

1. A fusing apparatus for use in an electrostatographic reproduction machine to fuse a toner image formed on a substrate using toner having a known melting point temperature, the fusing apparatus comprising:

(a) a first heated fusing member and a second unheated fusing member contactably forming a fusing path for routing a substrate carrying thereon the image to be fused such that the image directly faces said first fusing member;

(b) external heating means for contactably heating said first fusing member to at least the known melting point temperature of the toner particles forming the image to be fused; and (c) temperature control means for maintaining the temperature of said second fusing member during run periods and standby periods of the fusing apparatus, at a point below the melting point temperature of the toner particles forming the image to be fused, said temperature control means including means for separating said second fusing member from contact with said first fusing member during standby periods while simultaneously retaining said first fusing member in heating contact with said external heating means.

2. The fusing apparatus of claim 1 wherein said first fusing member is a fuser roller.

3. The fusing apparatus of claim 2 wherein said second fusing member is a pressure roller.

4. An electrostatographic reproduction apparatus for producing simplex and duplex copies of images on a substrate, the reproduction apparatus comprising:

(a) means including an image bearing member for forming a plurality including first and second latent images on the image bearing member;

(b) means for developing the first and second latent images using toner particles having a known melting point temperature;

(c) transfer means for transferring one of said first and said second toner images to one side of a substrate;

(d) a fusing apparatus for fusing said unfused toner image on said substrate, said fusing apparatus including:

(i) a heated fuser roller for contacting one side of said substrate;

(ii) an unheated pressure roller mounted in nip contact with said fuser roller for contacting another side of said substrate; and (iii) temperature control means for maintaining the temperature of said pressure roller during run periods and standby periods of the fusing apparatus at a point below the known melting point temperature of the toner particles forming an image on said another side, said temperature control means including means for separating said pressure roller from contact with said fuser roller during standby periods while simultaneously retaining said fuser roller in heating contact with external heating means.

5. The reproduction apparatus of claim 1 including transport means for transporting said substrate from said fusing apparatus back to said transfer means such that the other of said first and said second toner images can be transferred onto said another side of said substrate.

6. A method for fusing duplex toner images on first and second sides of a substrate, the method comprising the steps of:

(a) routing the substrate during a run period of a fusing apparatus from the entrance side through the exit side of a fusing path formed by a heated first member and an unheated second member of the fusing apparatus such that a first side of the substrate directly faces said heated first member;

(b) transporting the substrate with a fused first image on said first side thereof back to the entrance side of said fusing path for again routing the substrate therethrough such that said first side of the substrate with the fused first image thereon now directly faces said second member; and (c) controlling the temperature of said second member during run periods as well as during standby periods at a temperature below the melting point temperature of the toner particles forming said fused first image on said first side of the substrate.

7. A fusing apparatus for fusing toner particles to a substrate, the fusing apparatus comprising:

(a) a pair of nesting heat rollers including a drive roller;

(b) an axially unsupported fuser roller nested between and heated by said pair of nesting heat rollers;

(c) an unheated pressure roller forming a fusing nip with said fuser roller and retaining said fuser roller against said pair of nesting rollers so as to enable said drive roller to frictionally rotate said fuser roller; and (d) bias means for separating said pressure roller from retaining contact with said fuser roller said bias means including retaining means for retaining said fuser roller against said pair of nesting rollers so as to enable said drive roller to continue rotating said fuser roller.

8. The fusing apparatus of claim 7 wherein each said bias means includes:

a pivotably mounted cam member having a first position out of contact with said fuser roller, and a second position in contact with said fuser roller.

9. The fusing apparatus of claim 8 wherein said bias means comprises a rotatable member mounted on said cam member for contacting and riding on said fuser roller.

10. The fusing apparatus of claim 8 wherein said bias means includes a pair of rotatable members that are mounted so as to both ride on said fuser roller only when said cam member is in said second position thereof.

11. The fusing apparatus of claim 10 wherein said cam member includes first and second cam surfaces, said first cam surface acting to move said pressure roller into contact with said fuser roller when said cam member is in said first out of contact position, and said second cam surface cooperating with said rotatable members to move said pressure roller away from said fuser roller when said cam member is in said second, contact position.

12. The fusing apparatus of claim 11 further including a temperature sensor that senses the temperature of said pressure roller.

* * * * *